United States Patent
Jordan et al.

(10) Patent No.: US 9,074,594 B2
(45) Date of Patent: Jul. 7, 2015

(54) COMPRESSED-AIR COMPRESSOR AND METHOD OF OPERATION

(75) Inventors: Steffen Jordan, Ronnenberg (DE); Christoph Wilken, Salzbergen (DE)

(73) Assignee: WABCO GmbH, Hannover (DE)

(*) Notice: Subject to any disclaimer, the term of this patent is extended or adjusted under 35 U.S.C. 154(b) by 462 days.

(21) Appl. No.: 12/932,000

(22) Filed: Feb. 14, 2011

(65) Prior Publication Data
US 2011/0200455 A1    Aug. 18, 2011

(30) Foreign Application Priority Data
Feb. 16, 2010   (DE) .......................... 10 2010 008 063

(51) Int. Cl.
| | |
|---|---|
| F04B 49/035 | (2006.01) |
| B60T 13/26 | (2006.01) |
| B60T 17/02 | (2006.01) |
| F04B 49/24 | (2006.01) |

(52) U.S. Cl.
CPC .............. *F04B 49/035* (2013.01); *F04B 49/24* (2013.01); *B60T 13/268* (2013.01); *B60T 17/02* (2013.01)

(58) Field of Classification Search
CPC ........ F04B 41/02; F04B 49/022; F04B 49/08; F04B 49/16; F04B 49/125; F04B 35/002; F04B 49/03; F04B 49/035; F04B 49/22; F04B 49/225; F04B 49/24; B60T 17/02
USPC .................. 417/53, 415, 225, 214, 364, 534; 60/415
See application file for complete search history.

(56) References Cited

U.S. PATENT DOCUMENTS

| | | | | |
|---|---|---|---|---|
| 1,874,752 | A | * | 8/1932 | Hirsch ............................... 92/82 |
| 3,338,509 | A | * | 8/1967 | McAninch .................... 417/242 |
| 4,346,732 | A | * | 8/1982 | Moos ............................. 137/489 |
| 4,515,530 | A | * | 5/1985 | Christoleit .................... 417/214 |
| 7,779,629 | B2 | * | 8/2010 | Isono et al. ..................... 60/413 |
| 8,172,557 | B2 | * | 5/2012 | Hilger et al. .................. 417/569 |
| 2007/0160484 | A1 | * | 7/2007 | Inoue ............................. 417/437 |

FOREIGN PATENT DOCUMENTS

DE    10 2006 060 660 A1    6/2008

* cited by examiner

*Primary Examiner* — Devon Kramer
*Assistant Examiner* — Amene Bayou
(74) *Attorney, Agent, or Firm* — Kramer Levin Naftalis & Frankel LLP

(57) ABSTRACT

A compressed-air compressor for producing compressed air for a compressed-air system of a vehicle includes a cylinder and a piston. The piston is arranged in the cylinder and divides the interior space of the cylinder into a compression chamber, which can be connected to the compressed-air system of the vehicle for the purpose of conveying compressed air, and a neutral chamber. The neutral chamber is charged with an auxiliary pressure such that the pressure in the neutral chamber is temporally on average higher than atmospheric pressure. The compressed air production using the piston/cylinder-type compressed-air compressor is improved such that the maximum value of the torque to be imparted for driving the compressor is reduced.

10 Claims, 2 Drawing Sheets

COMPRESSED-AIR COMPRESSOR AND METHOD OF OPERATION

CROSS-REFERENCE TO RELATED APPLICATION

This application claims the benefit of DE 10 2010 008 063.2 filed on Feb. 16, 2010, the disclosure of which is incorporated herein by reference in its entirety. A certified copy of the foregoing is being submitted concurrently with the filing of this application.

BACKGROUND OF THE INVENTION

The present invention is directed generally to embodiments of a new compressed-air compressor for a compressed-air system of a vehicle and a method of operating same.

Compressed-air compressors of the general type under consideration are used, for example, for producing compressed air for pneumatic brake systems in utility vehicles— that is, heavy goods vehicles. In the field of passenger motor vehicles, compressed-air compressors are used, for example, for producing compressed air for pneumatic ride-height control systems. In the field of utility vehicles, the compressed-air compressors are generally driven by means of the drive engine of the vehicle. In the field of passenger motor vehicles, the compressed-air compressors are driven by means of an electric motor provided specifically for such purpose.

A compressed-air compressor of the general type under consideration can be designed as a piston machine and therefore has a cylinder and a piston arranged in the cylinder. The piston divides the interior space of the cylinder into a compression chamber and a chamber separated therefrom at the pressure side that is generally connected to the crankcase of the compressor. The chamber is referred to hereinafter as the "neutral chamber."

The operation of such a piston compressor involves a suction phase, in which the volume of the compression chamber is increased as a result of a piston movement and, in the process, air is sucked in from atmosphere and conducted via an inlet valve into the compression chamber. The suction phase is followed by a compression phase, in which the volume of the compression chamber is reduced as a result of an opposite movement of the piston. Here, the inlet valve is closed, such that the air situated in the compression chamber cannot escape. The air in the compression chamber is compressed until the piston reaches its top dead center and the volume of the compression chamber is minimized, or until the compressed air has been discharged via an outlet valve to components of the compressed-air system that are connected to the compressor outlet. During the compression phase, the torque to be imparted for driving the compressor increases up to its maximum value. The maximum value falls back to zero as top dead center is reached.

SUMMARY OF THE INVENTION

Generally speaking, it is an object of the present invention to improve compressed air production by means of a piston/cylinder-type compressed-air compressor such that the maximum value of the torque to be imparted for driving the compressor is reduced.

The above-described mode of operation of a piston compressor results in the pressure present in the neutral chamber increasing in relation to a temporally average pressure value during a suction phase and falling in relation to the temporally average pressure value during a compression phase. Temporally on average, atmospheric pressure, for example, prevails in the neutral chamber. During the suction phase, the pressure in the neutral chamber increases to a value above the temporally average value of the pressure, and in the compression phase, the pressure in the neutral chamber falls to a value below the temporally average value of the pressure.

According to embodiments of the present invention, the neutral chamber of the compressed-air compressor is charged with an auxiliary pressure, such that the pressure in the neutral chamber is temporally on average higher than atmospheric pressure. Thus, advantageously, by simple, cost-effective means, the required maximum torque for driving the compressed-air compressor is considerably reduced, specifically to approximately half of the torque otherwise required in a similar compressed-air compressor.

The inventive embodiments can advantageously also be used in existing compressor designs without great expenditure. A complete redesign of a compressor is therefore not required. It is necessary merely to provide on the compressor a facility for the supply of the auxiliary pressure to the neutral chamber, for example an additional compressed-air port that is connected to the neutral chamber and that permits an intake of pressure from the compressed-air system. If the crankcase of the compressed-air compressor is not pressure-tight, then as an additional measure, the crankcase can be made pressure-tight.

Furthermore, the auxiliary pressure can be branched off at any desired point of the compressed-air system, for example at the compressor outlet, at a compressed-air accumulator or at the compressed-air processing system.

Additionally, by means of inventive embodiments, the torque profile of the required drive torque of the compressed-air compressor can be homogenized over the profile of the crankshaft rotation. Peak torques occurring here, that is, the maximum values of the torque to be imparted for driving the compressor, can be approximately halved. In this way, it is possible to select a drive motor for the compressor, for example an electric motor, that is smaller and has a lower available torque. This permits cost and weight savings, which is highly advantageous in particular in passenger motor vehicles and also in utility vehicles.

A further advantage of the inventive embodiments is that, as a result of the considerable reduction of the peak torque, resulting forces within the compressed-air compressor are also reduced, for example the maximum values of the forces that act on the crankshaft and connecting rod bearings. Furthermore, the transverse forces exerted by the piston on the cylinder wall are likewise reduced. In this way, the compressed-air compressor is more robust and durable, which is advantageous in particular in oil-free applications.

The embodiments of the present invention advantageously have application in piston/cylinder-type compressors of any design, for example for single-cylinder, two-cylinder or other multi-cylinder compressors. Also, the inventive embodiments advantageously can be used in compressors that operate on the double crankshaft principle, that is, compressors that have two connecting rods per cylinder and two crankshafts, as described, for example, in DE 10 2006 060 660 A1.

According to an embodiment of the present invention, the neutral chamber can be connected to a compressed-air stabilization device for producing a stabilized auxiliary pressure. The pressure stabilization device can be connected with an outlet side to the neutral chamber, for example via a compressed-air port connected to the neutral chamber. The pressure stabilization device advantageously provides a stabilized and therefore substantially temporally constant auxiliary pressure in the neutral chamber, which auxiliary pressure, with a corresponding design of the compressed-air stabilization device, can lie at a suitable pressure level, for example at approximately 50% of the pressure level output by the compressed-air compressor at the compressor outlet. A particularly efficient homogenization of the occurring peak torques can be obtained in this way.

According to another embodiment, the compressed-air stabilization device is arranged on the compressed-air compressor. The compressed-air stabilization device can, for example, be screwed to or flange-mounted on the compressed-air compressor. It is also advantageous for the compressed-air stabilization device to be formed integrally in the compressor.

For the supply of auxiliary pressure to the neutral chamber, the compressor can have a separate compressed-air port. The compressed-air stabilization device can then be connected to the compressed-air port. In one embodiment, the auxiliary pressure supply to the neutral chamber can also be provided integrally in or on the compressed-air compressor. It is, for example, desirable to provide in the housing of the compressed-air compressor a compressed-air duct that leads from the compressor outlet via a spring-loaded check valve to the neutral chamber. The spring-loaded check valve is dimensioned such that, as a result of a coordination of the spring force and the effective valve loading surface area, the desired pressure level of the auxiliary pressure, for example approximately 50% of the outlet pressure of the compressed-air compressor, is provided in the neutral chamber.

According to a further inventive embodiment, the compressed-air stabilization device is connected at an inlet port to a compressed-air accumulator of the compressed-air system and at a first outlet port to the neutral chamber. This has the advantage that, at the inlet side of the compressed-air stabilization device, compressed air is supplied with a high degree of availability and consistency, such that at the outlet side of the compressed-air stabilization device, the auxiliary pressure can also be provided to the neutral chamber with a high degree of availability and consistency. The compressed-air stabilization device can be designed as a pressure-limiting valve or as a pressure regulator. Such compressed-air stabilization devices are commercially available.

It is advantageous for the auxiliary pressure to lie in the range from 40%-60% of the outlet pressure of the compressed-air compressor. The exact value of the optimum auxiliary pressure can be determined both on a compressor-specific basis and also with regard to the respective application of the compressed-air compressor in the compressed-air system.

According to yet another embodiment of the present invention, the compressed-air stabilization device is formed integrally with a compressed-air processing system. In this way, the inventive embodiment can be realized in a compact and cost-effective manner.

According to a further embodiment, the auxiliary pressure is variably adjustable or variably controllable. In this way, during operation of the compressed-air compressor, the auxiliary pressure can be set to a desired value, for example as a function of the present operating conditions.

According to a still further embodiment, the compressed-air stabilization device has an inlet hysteresis of at least 2 bar. In this way, compressed air losses on account of pressure regulation by the compressed-air stabilization device can be minimized, as a result of which the overall efficiency of the compressed air production by the compressed-air compressor can be optimized.

According to another embodiment of the present invention, the compressed-air compressor has a crankcase connected to the neutral chamber or forming at least a part of the neutral chamber. The crankcase advantageously has the pressure level of the neutral chamber. This likewise permits the use and adaptation of existing commercially available compressed-air compressors.

Reduction of the maximum torque for driving the compressed-air compressor can be further improved by means of additional assisting measures. Such a measure is, for example, the provision of a spring in the cylinder, which spring acts on the piston. The piston is assisted by spring force in the direction of the compression chamber, such that, likewise, the force acting from the compression chamber on the piston as a result of the compression of the air is at least partially compensated by the spring force. The spring can be designed as a tensile or compression spring depending on the design of the compressed-air compressor, for example as a compression spring in the crankcase. A further measure for minimizing the maximum torque is the provision of a flywheel on the crankshaft. The flywheel, likewise, brings about a homogenization of the torque profile of the drive torque of the compressed-air compressor, as a result of which the peak values of the torque are reduced.

Also advantageous is a compressed-air system for a vehicle having at least one compressed-air accumulator and one compressed-air compressor according to the above-described inventive embodiments. Also, the claimed invention relates to a method for operating a compressed-air compressor for producing compressed air for a compressed-air system of a vehicle.

Still other objects and advantages of the present invention will in part be obvious and will in part be apparent from the specification.

The present invention accordingly comprises the various steps and the relation of one or more of such steps with respect to each of the others, and embodies features of construction, combinations of elements, and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the inventive embodiments, reference is had to the following description taken in connection with the accompanying drawings in which.

DETAILED DESCRIPTION OF THE PREFERRED EMBODIMENTS

Figure 1:
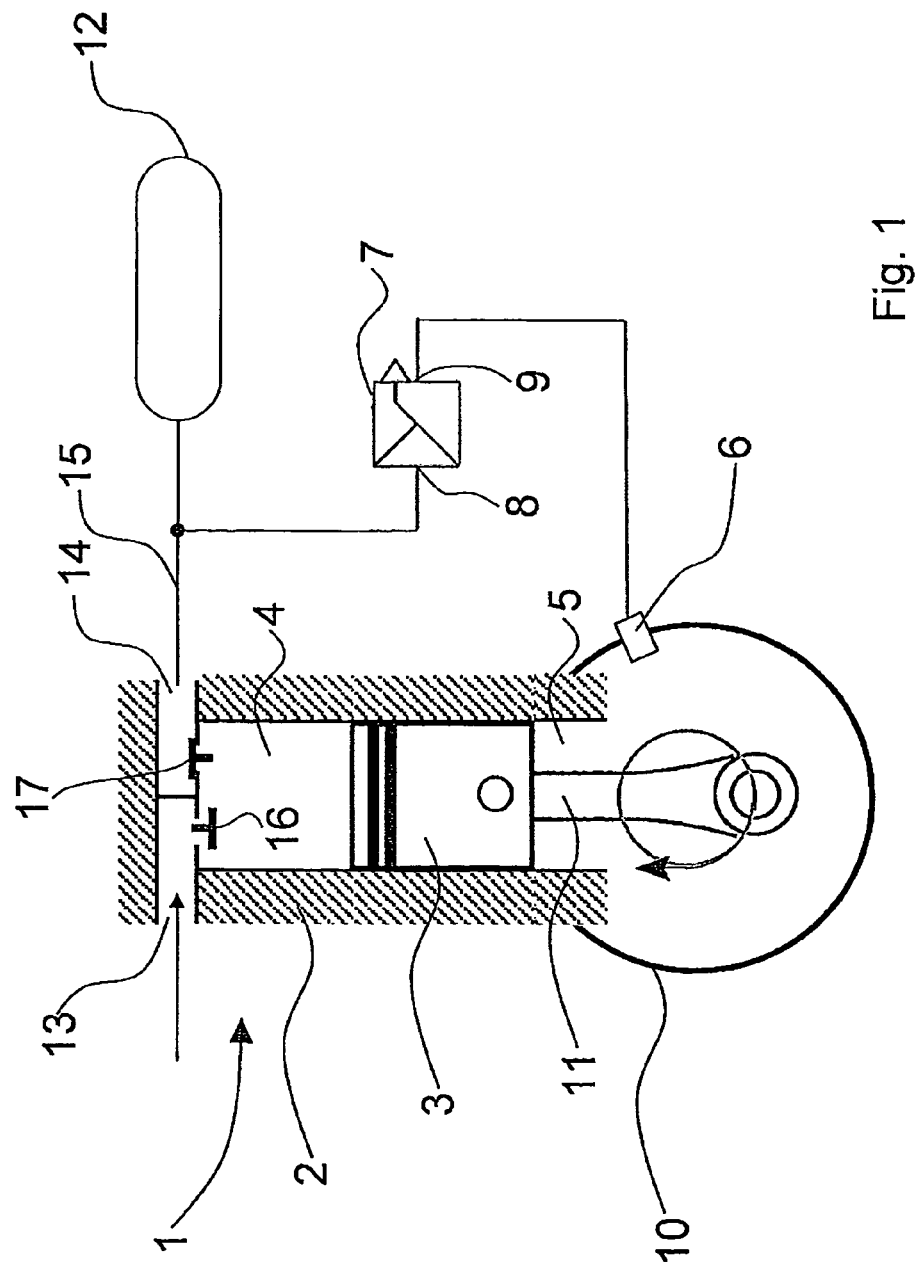
FIG. 1 is a schematic illustration of a compressed-air system for a vehicle in accordance with an embodiment of the present invention.

Referring now to the drawing figures, FIG. 1 shows a compressed-air system for a vehicle having a compressed-air compressor 1 and a compressed-air accumulator 12, which is connected via a compressed-air line 15 to the compressed-air compressor 1. Further elements of the compressed-air system can also be connected to the compressed-air line 15, such as, for example, an air dryer and a multi-circuit protection valve in the case of brake systems in utility vehicles. Such elements, which are known per se, of compressed-air systems are not illustrated in FIG. 1 for simplicity, and are symbolized by the compressed-air line 15.

The compressed-air compressor 1 is designed as a piston compressor. It has a cylinder 2 with a piston 3 arranged therein. As is known in piston compressors, the piston is connected via a connecting rod 11 to a driveshaft designed as a crankshaft.

The piston 3 divides an interior space of the cylinder 2 into a compression chamber 4 and a neutral chamber 5. In FIG. 1, the compression chamber 4 is shown arranged above the piston 3 and the neutral chamber 5 is arranged below the piston 3. For the pneumatic separation of the compression chamber from the neutral chamber, the piston 3 has an encircling seal. By means of a rotation of the driveshaft, the piston 3 is moved upward or downward by means of the connecting rod 11. A downward movement corresponds to a suction phase of the compressed-air compressor 1, in which the compression chamber 4 is increased in size. During the suction phase, an inlet valve 16 opens as a result of a vacuum generated in the compression chamber 4. As a result, ambient air flows into the compression chamber 4 via an inlet port 13, which is connected to atmosphere, of the compressed-air compressor 1. During an upward movement of the piston 3, which corresponds to a compression phase, the piston 3 reduces the volume of the compression chamber 4. The air situated in the compression chamber 4 is compressed, which leads to a pressure increase in the compression chamber 4. As a result, the inlet valve 16 closes. The pressure in the compression chamber 4 increases further until either an outlet valve 17 opens or the piston 3 reaches its top dead center. The outlet valve 17 opens if the pressure in the compression chamber 4 exceeds the pressure in the region of a second outlet connection 14, which forms the compressor outlet, of the compressed-air compressor 1. The second outlet connection 14 of the compressed-air compressor is connected via the compressed-air line 15 to the further elements of the compressed-air system, in particular to the compressed-air accumulator 12.

On the side of the piston 3 that faces away from the compression chamber 4, there is situated adjacent to the neutral chamber 5 a crankcase 10 of the compressed-air compressor 1. The interior of the crankcase 10 is connected to the neutral chamber 5. That is, the neutral chamber 5 is situated at the pressure level of the interior of the crankcase 10. The neutral chamber 5 can also be a part of the interior of the crankcase 10.

According to FIG. 1, a compressed-air port 6 is provided on the crankcase 10. The auxiliary pressure is supplied to the neutral chamber 5 via the compressed-air port 6, specifically by means of a compressed-air stabilization device 7, which, according to FIG. 1, is designed as a pressure regulator. The pressure regulator 7 has an inlet port 8 and a first outlet port 9. The first outlet port 9 is connected via a compressed-air line to the compressed-air port 6. The inlet port 8 of the pressure regulator 7 is connected to the compressed-air line 15 and is therefore connected to the compressed-air accumulator 12.

Figure 2:
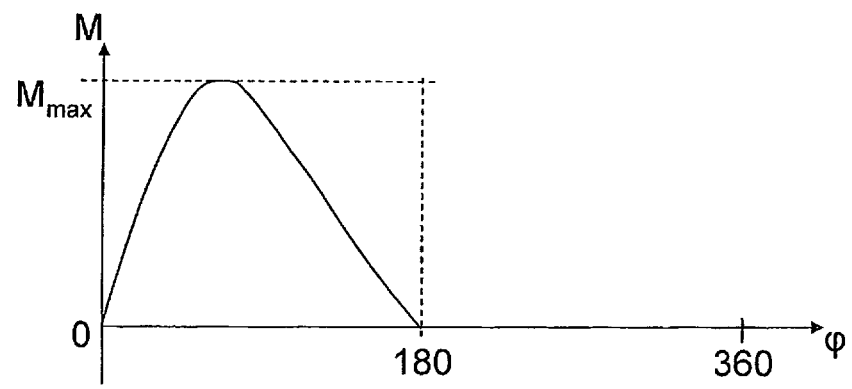
FIG. 2 graphically depicts a torque profile of a single-cylinder compressed-air compressor.

FIG. 2 shows the basic profile of the torque M required for driving the compressed-air compressor 1, which torque is applied to the crankshaft of the compressed-air compressor. The torque M is plotted in FIG. 2 versus the rotational angle cp of the driveshaft of the compressed-air compressor. The rotational angle cp is illustrated in the range from 0 to 360°, that is, for one full rotation of the crankshaft. FIG. 2 shows the torque profile for a compressed-air compressor according to the prior art or for the compressed-air compressor according to FIG. 1 when the neutral chamber is not charged with the auxiliary pressure.

As can be seen in FIG. 2, the torque M reaches the maximum value $M_{max}$ at a rotational angle between 0 and 180°. At the start, there is a steep rise in the torque M. After passing over the maximum value $M_{max}$, the torque M rapidly falls. In the second half of a rotation (rotational angle φ>180° C.), the required torque M is substantially equal to zero. This profile is repeated with every crankshaft rotation.

Figure 3:
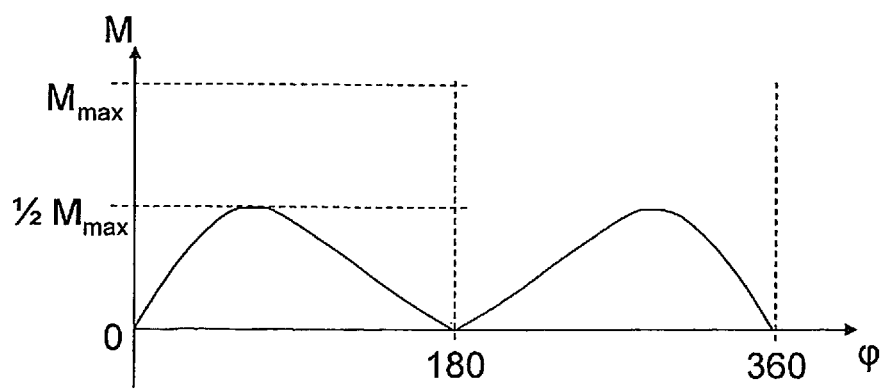
FIG. 3 graphically depicts a further torque profile of a single-cylinder compressed-air compressor.

FIG. 3 shows a profile of the torque M in the same compressed-air compressor as in FIG. 2, wherein in the case of FIG. 3, the neutral chamber 5 is charged with an auxiliary pressure of approximately half of the outlet pressure produced by the compressed-air compressor 1. As can be seen, the maximum value of the torque M lies at approximately half of the value $M_{max1}$, with the maximum value now being reached twice per crankshaft rotation, specifically at a rotational position below 180° and at a rotational position between 180° and 360°.

In the compressed-air compressor according to embodiments of the present invention whereby the compressor includes a cylinder, a piston arranged in the cylinder dividing the interior space of the cylinder into a compression chamber, which can be connected to the vehicle compressed-air system, and a neutral chamber, a method for operating the compressed-air compressor for producing compressed air for the vehicle compressed-air system includes charging the neutral chamber with an auxiliary pressure such that the pressure in the neutral chamber is temporally on average higher than atmospheric pressure. The auxiliary pressure can be derived from the compressed-air system. It is also advantageous for the neutral chamber to be charged with a stabilized auxiliary pressure, for example by means of a compressed-air stabilization device.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A compressed-air compressor for producing compressed air for a compressed-air system of a vehicle, said compressor comprising:
    a cylinder;
    a piston arranged in said cylinder, said piston dividing an interior space of said cylinder into a compression chamber connectable to said compressed-air system of said vehicle for conveying compressed air, and a neutral chamber, said neutral chamber being charged with an auxiliary pressure such that pressure in said neutral chamber is temporally on average higher than atmospheric pressure; and
    a compressed-air stabilization device connected (i) at an inlet port to a compressed-air accumulator of said compressed-air system and an outlet connection of the cylinder and (ii) at an outlet port to said neutral chamber, wherein said compressed-air compressor has a crankcase one of connected to said neutral chamber and forming at least a part of said neutral chamber, said crankcase having a pressure level of said neutral chamber.

2. The compressed-air compressor as claimed in claim 1, said compressed-air stabilization device producing a stabilized auxiliary pressure.

3. The compressed-air compressor as claimed in claim 2, wherein said compressed-air stabilization device is one of mounted on said compressed-air compressor and formed integrally with said compressed-air compressor.

4. The compressed-air compressor as claimed in claim 3, wherein said compressed-air stabilization. device is flange-mounted on said compressed-air compressor.

5. The compressed-air compressor as claimed in claim 2, wherein said compressed-air stabilization device is one of a pressure-limiting valve and a pressure regulator.

6. The compressed-air compressor as claimed in claim 2, wherein said compressed-air stabilization device has an inlet hysteresis of at least 2 bar.

7. The compressed-air compressor as claimed in claim 1, wherein said auxiliary pressure is in the range from about 40% to about 60% of an outlet pressure. of said compressed-air compressor.

8. A compressed-air system for a vehicle comprising: at least one compressed-air accumulator; and a compressed-air compressor for producing compressed air for the compressed-air system of the vehicle, said compressor comprising:
a cylinder;
a piston arranged in said cylinder, said piston dividing an interior space of said cylinder into a compression chamber connectable to said compressed-air system of said vehicle for conveying compressed air, and a neutral chamber, said neutral chamber being charged with an auxiliary pressure such that pressure in said neutral chamber is temporally on average higher than atmospheric pressure; and
a compressed-air stabilization device connected (i) at an inlet port to the at least one compressed-air accumulator and an outlet connection of the cylinder and (ii) at an outlet port to said neutral chamber, wherein said compressed-air compressor has a crankcase one of connected to said neutral chamber and forming at least a part of said neutral chamber, said crankcase having a pressure level of said neutral chamber.

9. A method for operating a compressed-air compressor for producing compressed air for a compressed-air system of a vehicle, said compressed-air compressor including a cylinder, a piston in said cylinder dividing an interior space of said cylinder into a compression chamber connectable to said compressed-air system of said vehicle for conveying compressed air and a neutral chamber, the compressed-air compressor further including a crankcase one of connected to said neutral chamber and forming at least a part of said neutral chamber, said crankcase having a pressure level of said neutral chamber, and a compressed-air stabilization, device connected (i) at an inlet port to a compressed-air accumulator of said compressed-air system and an outlet connection of the cylinder and (ii) at an outlet port to said neutral chamber, the method comprising the step of charging said neutral chamber with a stabilized auxiliary pressure via the compressed-air stabilization device such that pressure in said neutral chamber is temporally on average higher than atmospheric pressure.

10. The method as claimed in claim 9, wherein said auxiliary pressure is a stabilized pressure.

* * * * *